US012666340B2

(12) United States Patent　(10) Patent No.: US 12,666,340 B2
Roy et al.　(45) Date of Patent: Jun. 23, 2026

(54) RADIO-FREQUENCY (RF) GATEWAY REDUNDANCY SCHEMES FOR SATELLITE COMMUNICATION NETWORKS

(71) Applicant: Hughes Network Systems, LLC, Germantown, MD (US)

(72) Inventors: Satyajit Roy, Gaithersburg, MD (US); Rajeev Oza, Boyds, MS (US)

(73) Assignee: Hughes Network Systems, LLC, Germantown, MD (US)

( * ) Notice: Subject to any disclaimer, the term of this patent is extended or adjusted under 35 U.S.C. 154(b) by 332 days.

(21) Appl. No.: 18/463,502

(22) Filed: Sep. 8, 2023

(65) Prior Publication Data

US 2025/0088943 A1　Mar. 13, 2025

(51) Int. Cl.
　*H04W 4/00*　(2018.01)
　*H04W 40/28*　(2009.01)
　*H04W 40/36*　(2009.01)
(52) U.S. Cl.
　CPC ........... *H04W 40/36* (2013.01); *H04W 40/28* (2013.01)
(58) Field of Classification Search
　CPC .............................. H04W 40/36; H04W 40/28
　See application file for complete search history.

(56) References Cited

U.S. PATENT DOCUMENTS

2012/0239966 A1* 9/2012 Kompella ............. H04W 24/04
　　　　　　　　　　　　　　　714/E11.073
2015/0163002 A1* 6/2015 Frison ................... H04J 3/0641
　　　　　　　　　　　　　　　370/220

2017/0118067 A1* 4/2017 Vedula .................... H04L 43/10
2018/0302807 A1* 10/2018 Chen ...................... H04W 28/26
2018/0359290 A1* 12/2018 Kodaypak ........... H04L 65/1069
2019/0327738 A1* 10/2019 Torres ................... H04W 24/02
2020/0119807 A1* 4/2020 Whitefield ......... H04B 7/18541
2021/0058293 A1* 2/2021 Whitefield ......... H04B 7/18539
2021/0203412 A1* 7/2021 Whitefield ......... H04B 7/18519
2021/0274414 A1* 9/2021 Määttanen ............ H04W 76/11
2023/0370160 A1* 11/2023 Roy ................... H04B 7/18519
2024/0022318 A1* 1/2024 Yu ...................... H04B 7/18519

OTHER PUBLICATIONS

International Search Report and Written Opinion issued Nov. 4, 2024 in PCT/US2024/044132, filed Aug. 28, 2024.

* cited by examiner

*Primary Examiner* — Abdelnabi O Musa
(74) *Attorney, Agent, or Firm* — NovoTechIP International PLLC

(57) ABSTRACT

A radio-frequency (RF) redundancy method includes designating a plurality of RF gateways as initial primary RF gateways and designating an additional RF gateway as an initial backup RF gateway for the satellite communication system. A fault condition is detected in a first initial primary RF gateway, and a first switchover process is performed to switch the first initial primary RF gateway to a current backup RF gateway and to switch the initial backup RF gateway to a first current primary RF gateway. When a second initial primary RF gateway has the fault condition, a second switchover process is performed to switch the current backup RF gateway to a second current primary RF gateway and to switch the second initial primary RF gateway to the current backup RF gateway.

20 Claims, 12 Drawing Sheets

202

204    Initial State

206

202

204    RFGW 1 Fails

206

202

204    Switch Back

206

302

304

306

302

304

306

302

304

306

600

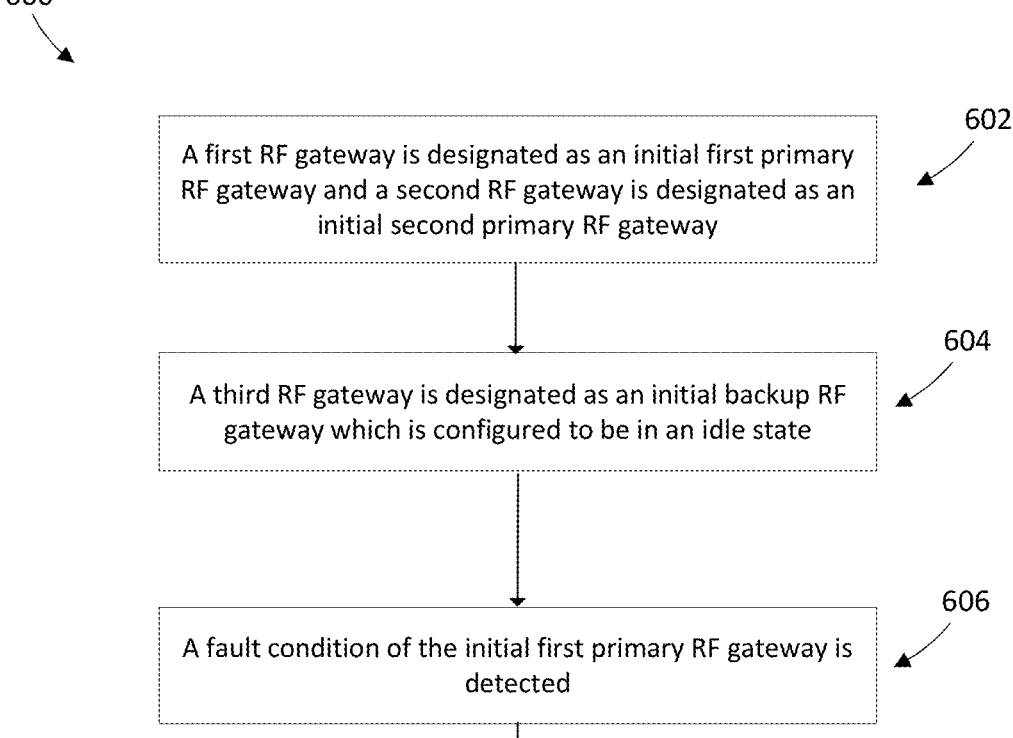

602

A first RF gateway is designated as an initial first primary RF gateway and a second RF gateway is designated as an initial second primary RF gateway

604

A third RF gateway is designated as an initial backup RF gateway which is configured to be in an idle state

606

A fault condition of the initial first primary RF gateway is detected

608

A first switchover process is then performed to switch the initial first primary RF gateway to a current backup RF gateway and to switch the initial backup RF gateway to a current first primary RF gateway

610

A fault condition of the initial second primary RF gateway is detected

612

A second switchover process is then performed to switch the current backup RF gateway to a current second primary RF gateway and to switch the initial second primary RF gateway to the current backup RF gateway

FIG. 6

RADIO-FREQUENCY (RF) GATEWAY REDUNDANCY SCHEMES FOR SATELLITE COMMUNICATION NETWORKS

TECHNICAL FIELD

The present disclosure is related generally to satellite communication systems, and, in particular, to RF gateway redundancy schemes for satellite communication systems.

BACKGROUND

Modern satellite communication systems provide a robust and reliable infrastructure to distribute data across vast distances, especially in remote areas where traditional networks, such as cable and cellular networks, are unreliable and/or unavailable. Significant time and effort have been spent in trying to find ways to increase the reliability and availability of satellite communication systems. One method that has been implemented to increase the availability of satellite communication systems is RF gateway redundancy. RF gateways include the hardware and software needed to transmit data to and receive data from a satellite. As such, RF gateways are susceptible to outages and performance degradation due to certain environmental factors and weather conditions.

An RF gateway redundancy scheme typically involves assigning one or more additional RF gateways to use as backups for a group of RF gateways (referred to as "primary RF gateways"). The issue with this approach is that backup RF gateways are typically returned to backup status once the primary RF gateway that it has replaced is restored. Therefore, two payload switching operations are typically performed each time a backup gateway is used. Payload switching operations take time and increase the chances of data transmission errors as well as decrease the lifetime of the satellite. Thus, current RF gateway redundancy schemes are inefficient and prone to errors.

What is needed therefore is an RF gateway redundancy scheme that minimizes the number of payload switches and the time required to implement the redundancy.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions may include configuring a plurality of radio-frequency (RF) gateways as primary RF gateways for a satellite communication system and configuring the primary RF gateways to be in an active state to handle data transmissions; configuring at least one RF gateway as backup RF gateways and configuring the backup RF gateways to be in an idle state; detecting that a first primary RF gateway has a fault condition; performing a first switchover process to switch a first backup RF gateway to be one of the primary RF gateways and to switch the first primary RF gateway to be one of the backup RF gateways; detecting that a second primary RF gateway has the fault condition; and performing a second switchover process to switch a second backup RF gateway to be one of the primary RF gateways and to switch the second primary RF gateway to be one of the backup RF gateways.

In yet another general aspect, the instant disclosure presents a method of backing up radio-frequency (RF) gateways of a satellite communication system. The method includes designating a plurality of RF gateways as initial primary RF gateways for the satellite communication system, the initial primary RF gateways being in an active state to handle data communications; designating an additional RF gateway as an initial backup RF gateway for the satellite communication system, the initial primary RF gateways being in an idle state; detecting that a first initial primary RF gateway has a fault condition; performing a first switchover process to switch the first initial primary RF gateway to a current backup RF gateway and to switch the initial backup RF gateway to a first current primary RF gateway, the current backup RF gateway being in the idle state and the first current primary RF gateway being in the active state; detecting that a second initial primary RF gateway has the fault condition; and performing a second switchover process to switch the current backup RF gateway to a second current primary RF gateway and to switch the second initial primary RF gateway to the current backup RF gateway, the current backup RF gateway being in the idle state and the second current primary RF gateway being in the active state.

In a further general aspect, the instant application presents a method for hybrid rolling radio-frequency (RF) gateway backup in a satellite communication system. The method includes configuring a plurality of RF gateways as primary RF gateways for the main network portion of the satellite communication system and configuring the primary RF gateways to be in an active state to handle data transmissions; configuring at least one RF gateway as backup RF gateways for the main network portion and configuring the backup RF gateways to be in an idle state; detecting that a first primary RF gateway for the main network portion has a fault condition; performing a switchover process to switch a first backup RF gateway to be one of the primary RF gateways of the main network portion and to switch the first primary RF gateway to be one of the backup RF gateways of the main network portion; and for a regionalized portion of the satellite communication system: detecting that a first primary regional RF gateway for a first region of the regionalized portion has a fault condition; performing a switchover process to switch a second backup RF gateway of the main network portion to be a primary RF gateway for the first region in place of the first primary regional RF gateway and placing the first regional primary RF gateway into an idle state; once the first regional primary RF gateway does not have the fault condition, performing a switchover process to switch the first regional primary RF gateway in as the primary RF gateway for the first region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6 depicts a flowchart of an example method for backing up RF gateways in a satellite communication system.

DETAILED DESCRIPTION

Figure 1:
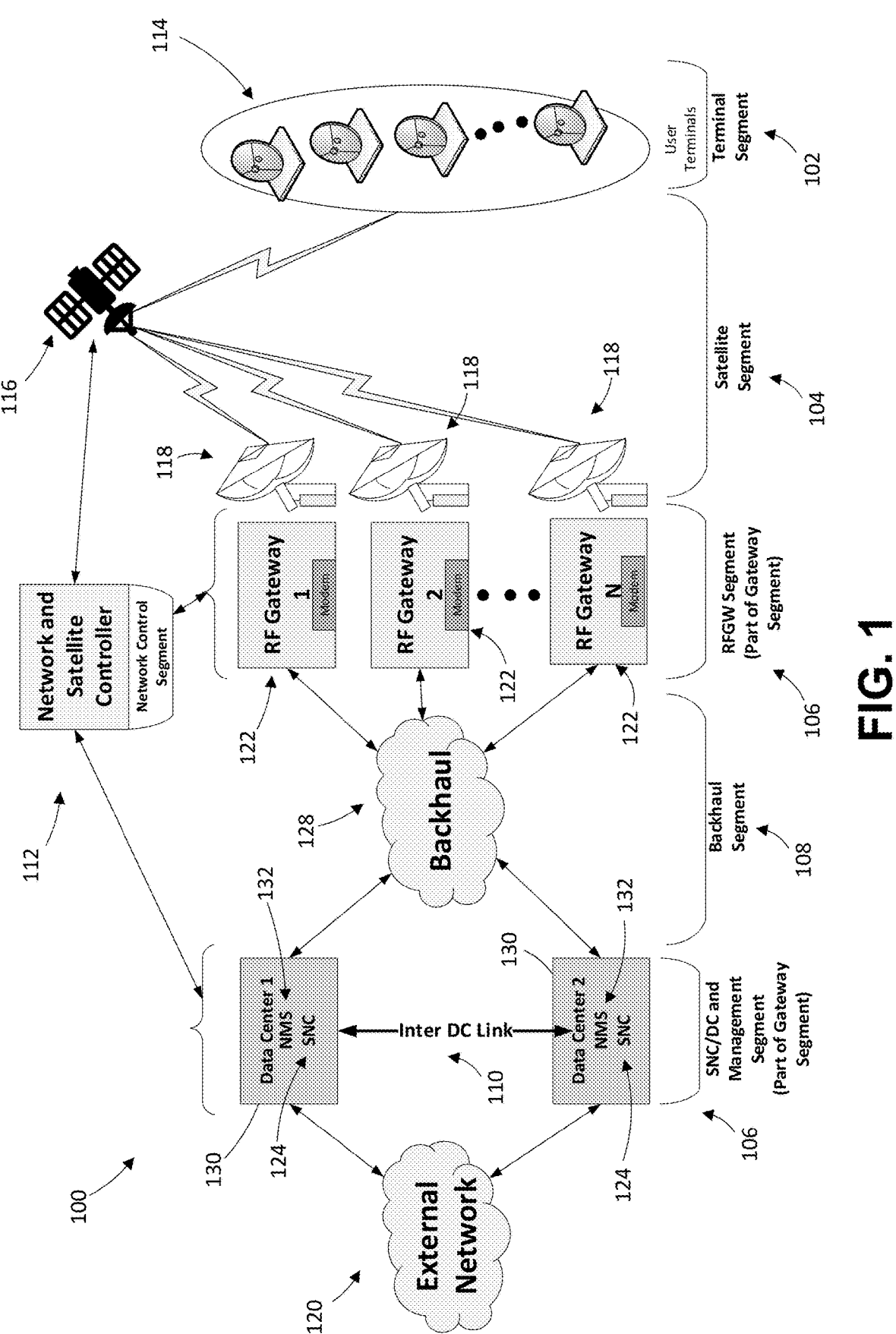
FIG. 1 is a diagram showing an example satellite communication system in which the RF gateway redundancy schemes disclosed herein may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Modern satellite communication systems provide a robust and reliable infrastructure to distribute data across vast distances, especially in remote areas where traditional networks, such as cable and cellular networks, are unreliable and/or unavailable. Satellite communication systems have become an essential resource for many applications and services, including television, telephone, radio, internet, and military applications, due to the global connectivity and high data transmission rates provided by these systems. Due to the widespread use and often critical nature of satellite communication services, significant effort has been expended in finding ways to improve reliability, efficiency, and quality of service of satellite communication systems. One component of a satellite communication system that is crucial in terms of reliability, efficiency, and quality of service of the system is an RF gateway. RF gateways includes the hardware and software needed to transmit data to and receive data from a satellite. Because RF gateways are typically associated with and provide satellite communication services to a large number of satellite terminals (i.e., customer premises equipment (CPEs)) at the same time, the failure of a single RF gateway can adversely impact the services provided to a large number of customers. This is exacerbated by the fact that the frequency bands used for data transmission to and from a satellite are susceptible to degradation/attenuation (e.g., rain fade) due to certain environmental and/or weather-related conditions.

To minimize the impact of RF gateway outages and/or performance degradation, satellite communication systems often implement some type of RF gateway redundancy scheme. An RF gateway redundancy scheme typically involves assigning one or more additional RF gateways to use as backups for a group of RF gateways (referred to as "primary RF gateways"). When a primary RF gateway fails or experiences rain fade or some other form of performance degradation, a backup RF gateway is activated to take over for the primary RF gateway. Once the failed/degraded (i.e., sick) primary RF gateway is fixed (or replaced by another primary RF gateway), the RF gateway is restored as a primary RF gateway, and the backup RF gateway is returned to backup status to await the failure of another primary RF gateway.

One issue with this approach is that each time a backup RF gateway is activated to replace a failed or sick primary RF gateway, two payload switchover operations will typically result: one payload switchover operation to switch the payload from the sick primary RF gateway to a backup RF gateway, and a second payload switchover operation to switch the payload back to the primary RF gateway once it is fixed (i.e., healed or replaced). Previously known payload switching operations take time and increase the likelihood of data transmission errors and decrease satellite lifetime.

To address these technical problems and more, in an example, this description provides a technical solution in the form of RF gateway redundancy schemes which may be implemented in a satellite communication system that involves configuring one or more additional RF gateways as initial backups, or standby RF gateways (as opposed to static or permanent backups) for a group of primary RF gateways. When a fault of a primary RF gateway is identified, one of the standby RF gateways is selected to replace the primary RF gateway experiencing the fault switchover. As used herein, a "fault switchover" refers to any condition, performance metric, operation parameter, and the like indicative of a fault, failure, outage, or degraded performance of an RF gateway. A primary RF gateway that is experiencing a fault switchover may be referred to herein as "sick", "unhealthy." "degraded", "failed", "faded", or other suitable adjective or designator. A switchover operation is performed to replace the sick primary RF gateway with the selected standby RF gateway.

Once the operation has been completed, the standby RF gateway is designated a primary RF gateway for the satellite communication system. Once a sick RF gateway has been restored (i.e., healed) and is capable of operating within desired specifications, the once-sick RF gateway is designated a standby RF gateway for the group of primary RF gateways and can be used to replace the next sick primary RF gateway. In other words, there are no static/permanent backup RF gateways. The RF gateways that are designated as standby RF gateways and primary RF gateways are rolling, meaning that they are continuously changing over time as sick RF gateways are replaced and restored. Consequently, only one switchover operation is required to be performed each time a primary RF gateway is switched with a backup RF gateway.

The redundancy schemes of this disclosure also enable a fast and reliable switchover process. As discussed below, the outroute and inroute RF components of the RF gateways are mapped to corresponding outroute and inroute components of satellite core networks (SNCs). A switchover process entails mapping the outroute and inroute RF components of the backup RF gateway to the SNC outroute and SNC inroute components associated with the primary RF gateway that is being switched out. During the transition phase of the switchover process, the SNC outroute and inroute components associated with the primary RF gateway being switched out are instructed to route traffic to the outroute and inroute RF components of the backup RF gateway and to the outroute and inroute RF components of the primary RF gateway being switched out. Once the transition phase is completed, the SNC outroute and inroute components are associated with only the RF gateway that has been switched in. This method of switching enables a stringent traffic outage budget and maintenance of ongoing traffic sessions and CBR calls while gateways are switched in and out. In embodiments, the switchover scheme enables a traffic outage budget of 200 ms or less (excluding payload switch time).

The technical solutions described herein address the technical problem of inefficiencies and difficulties associated with backing up RF gateways in a satellite communication system. The technical solutions provide RF gateway redundancy schemes that reduce the overall number of switchover processes that need to be performed while at the same time reducing switching times and promoting reliable service during transitions.

FIG. 1 shows an example satellite communication system 100 in which the RF gateway redundancy scheme according to the present disclosure may be implemented. The satellite communication system 100 includes a terminal segment 102, a satellite segment 104, a gateway segment 106, a backhaul segment 108, an inter-DC (data center) or SNC (satellite network core) link segment 110, and a network control segment 112. The terminal segment 102 includes satellite terminals 114 and other components that enable end users to connect to the satellite communication system 100. Satellite terminals 114 may be used at a residence or place of business to provide a user with access to the Internet. Satellite terminals 114 typically include an outdoor unit (ODU) that includes an antenna, such as a satellite dish for receiving RF signals from and transmitting RF signals to a satellite 116, and an indoor unit (IDU), such as a set-top box or similar type of equipment, that includes a transceiver, a controller, memory, a local server, and other types of equipment which enable data to be transmitted and received via the ODU. Satellite terminals 114 enable client devices (not shown), such as computers, smart phones, tablets, televisions, and the like, to connect to access the services provided by the satellite communication system 100.

The satellite segment 104 provides connectivity between the terminal segment 102 and the gateway segment 106. The satellite segment 104 includes at least one satellite 116 via which data is transmitted between the satellite terminals 114 and RF components for the gateway segment 106. Satellite 116 may be any suitable type of communications satellite, such as a bent-pipe design geostationary satellite, which is capable of supporting data transmission in one or more frequency bands, such as C, Ku, Ka, Q. V, etc. The satellite segment 104 also includes the radio-frequency terminals (RFTs) and antennas (collectively referred to as RFTs 118) which are located at a gateway site with RF gateway components of the gateway segment 106. Communication between the satellite terminals 114 and the RFTs 118 are established via beams (e.g., spot beams) emitted by the satellite. Communication channels include an outroute channel which includes a forward uplink for transmitting data from a gateway to satellite 116 and a forward downlink for transmitting data from the satellite 116 to a satellite terminal. Communication channels also include an inroute channel which includes a return uplink for transmitting data from satellite terminals 114 to satellite 116 and a return downlink for transmitting data from the satellite 116 to the gateways.

The gateway segment 106 includes devices and components required to interface with the RFTs 118 of the satellite segment 104. The gateway segment 106 also includes network communication components needed to establish connectivity to the external network 120 (e.g., Internet). The gateway segment 106 has two logical components that can be deployed at the same or different sites: (1) RF gateways 122 and (2) Satellite Network Cores (SNCs) 124. An RF gateway 122 includes computing hardware and RF communication components for interfacing with the RFTs 118 and communicating via the satellite 116. RF communication components include at least one modem for converting analog data to digital data and vice versa. SNCs 124 include hardware and software components for implementing the link layer, network layer, and management layers which enable data communication between RF gateways 122 and the external network(s) 120 via backhaul network 128. In embodiments, SNCs 124 are implemented in data centers 130. A data center corresponds to the physical site or location where SNCs are hosted. For example SNC 124 is hosted at DC 130.

The backhaul segment 108 provides connectivity between RF gateways 122 and SNCs 124. The backhaul segment 108 includes networking components and infrastructure components for implementing a backhaul network 128 via which data communications between RF gateways 122 at gateway sites and SNCs 124 at data centers 130 are transmitted. The backhaul network 128 may also be used to provide remote access for network management system components of the network control segment 112. The inter-dc link segment 110 provides connectivity between data centers 130. The inter-de link segment 110 includes networking components and network infrastructure components that enable secure data communications.

The network control segment (NCS) 112 includes the central and distributed components required to manage the terminal and gateway segment (RFGW and SNC) components. In embodiments, the network control segment includes a network management system (NMS) 132 that provides tools for managing the satellite communication network and the terminals in the network. The NMS 132 may be responsible for managing all aspects of terminals within the system, including provisioning and commissioning of terminals. In embodiments, the NMS 132 may be hosted at one or more data center sites 130.

Figure 2A:
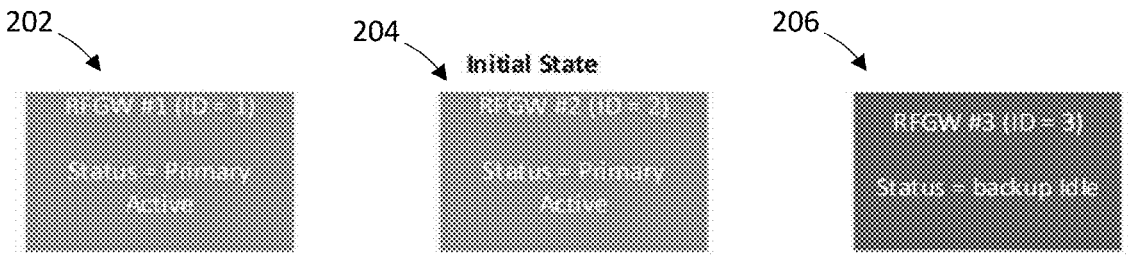
FIGS. 2A-2C show primary RF gateways and a backup RF gateway in an initial state, after a first switchover process, and after a second switchover process, respectively, of a static RF gateway redundancy scheme.
Figure 2B:
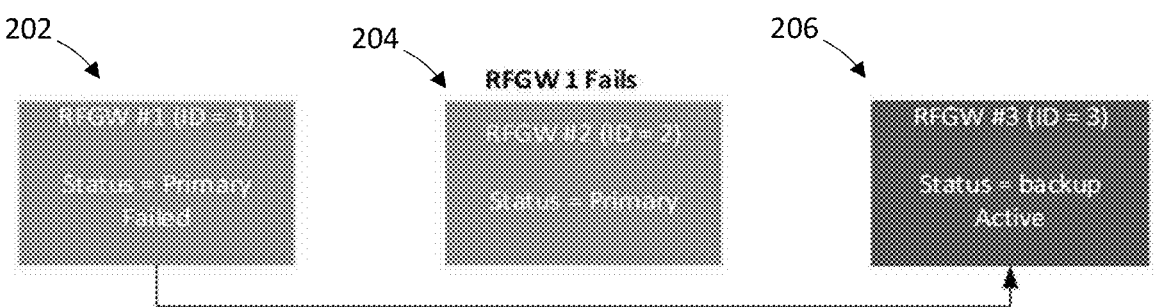
Figure 2C:
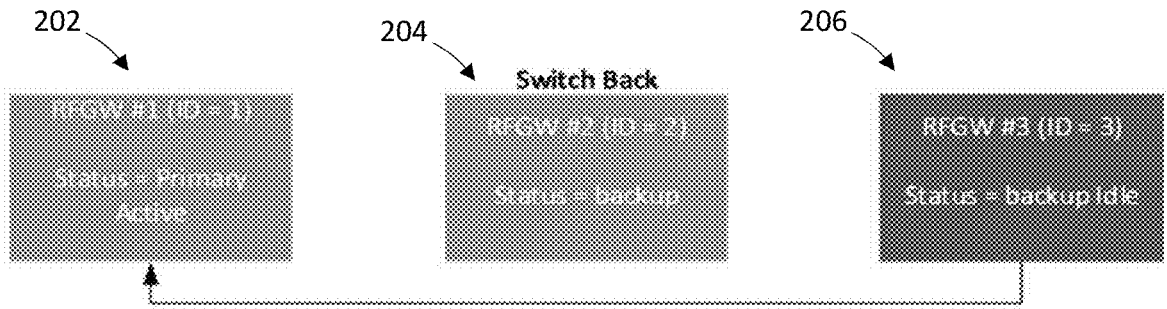

The satellite communication system 100 is configured to implement an RF gateway redundancy scheme. FIGS. 2A-2C show an example of a static RF gateway redundancy scheme. In a static RF gateway redundancy scheme, one or more backup RF gateways are designated which are used to back up the primary RF gateways. The redundancy is static since the same backup RF gateway is used for backing up all of the primary RF gateways of the system one at a given time. The redundancy scheme shown in FIGS. 2A-2C is an N+1 redundancy scheme in which there are N (in this case N=2) primary RF gateways 202, 204 with one additional RF gateway 206 designated as a backup RF gateway. FIG. 2A shows the initial states of the primary RF gateways 202, 204 and the backup RF gateway 206. Primary RF gateways 202, 204 are in a normal operating state designated as "active," and the backup RF gateway 206 is in an "idle" state. FIG. 2B shows the states of the RF gateways 202, 204, 206 during failure of the primary RF gateway 202. As can be seen in FIG. 2B, the status of the primary RF gateway 202 is "failed" while the primary RF gateway 204 is still in an "active" state. The backup RF gateway 206 is placed in an "active" state and used in place of the failed primary RF gateway 202 while the primary RF gateway 202 is in the "failed" state. FIG. 2C shows the states of the primary RF gateways 202, 204 and the backup RF gateway 206 once the failed primary RF gateway 202 is restored. The primary RF gateway 202 replaces the backup RF gateway 206, the state of the primary RF gateway 202 is changed from "failed" to "active," and the state of the backup RF gateway 206 is returned to "idle." Under this scheme, neither the backup RF gateway 206 nor the primary RF gateway 202 can be used to back up the other primary RF gateway 204 while the backup RF gateway is in an "active" state backing up RF gateway 202. The primary RF gateway 202 would have to be reactivated to free up the backup RF gateway 206 to back up the primary RF gateway 204.

Figure 3A:
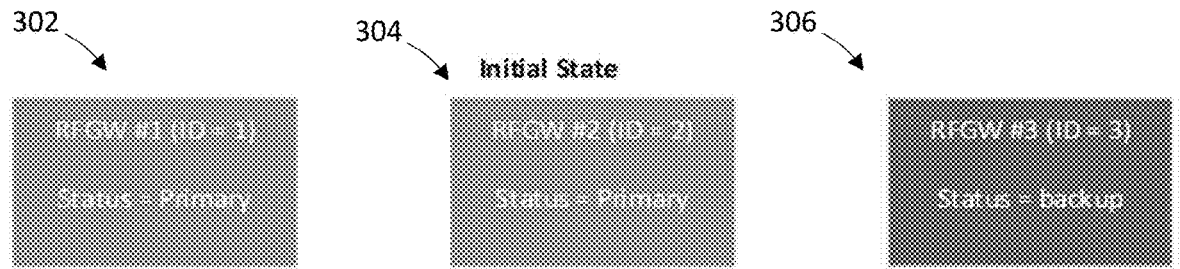
FIGS. 3A-3C show primary RF gateways and a backup RF gateway in an initial state, after a first switchover process, and after a second switchover process, respectively, of a rolling RF gateway redundancy scheme.
Figure 3B:
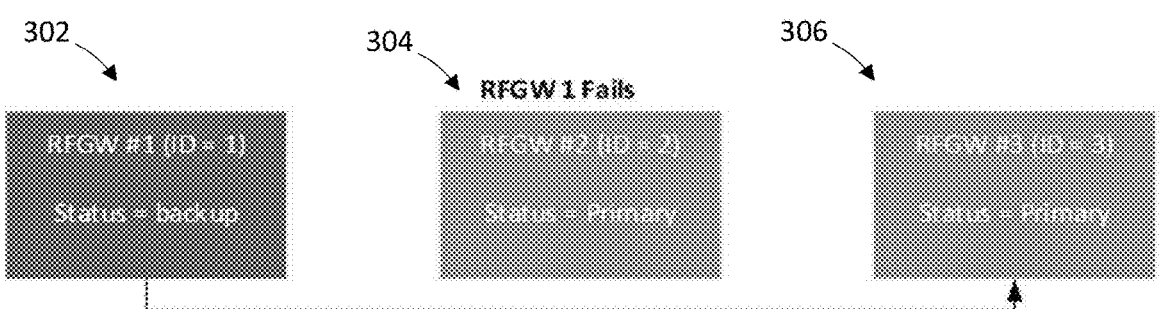
Figure 3C:
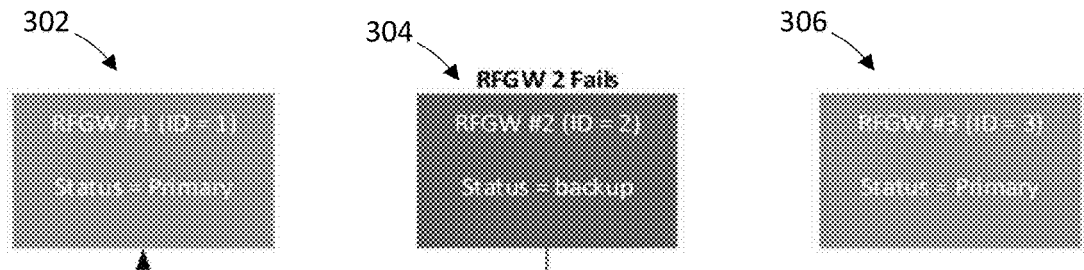

FIGS. 3A-3C show a simplified example implementation of a rolling RF gateway redundancy scheme according to this disclosure. The scheme shown in FIGS. 3A-3C is an N+1 scheme. In this example, the RF gateways 302, 304 are initially designated as primary RF gateways and the RF gateway 306 is initially designated the backup RF gateway. FIG. 3B shows the status of the RF gateways 302, 304, 306 when a failure of the RF gateway 302 is identified. A switchover operation is performed to switch-out the failed RF gateway 302 and switch-in the backup RF gateway 306. In this case, there is no switching operation performed to switch the RF gateway 302 back to a primary RF gateway. Once the RF gateway 302 is ready for operation, the RF gateway 302 is used as the backup RF gateway for the system. When the primary RF gateway 304 fails as shown in FIG. 3C, the RF gateway 304 is switched-out and RF gateway 302 is switched-in. Once the RF gateway 304 is ready for operation, the RF gateway 304 is used as the backup RF gateway for the system.

The example of FIGS. 3A-3C utilizes only two active or primary RF gateways and a single back RF gateway. The rolling redundancy scheme can be used with RF gateway groups including any number of primary RF gateways and rolling backup RF gateways. When multiple backup RF gateways are used, the system may implement selection logic to determine which backup RF gateway to switch-in when a primary RF gateway fails. The selection logic may take any suitable factor, characteristic, parameter, and the like into consideration in selecting backup RF gateways to replace failed or faded RF gateways, such as geographic location, power requirements, weather forecasts, etc. In implementations, all the RF gateways in a rolling group may need to have the same number of hardware components.

Figure 4A:
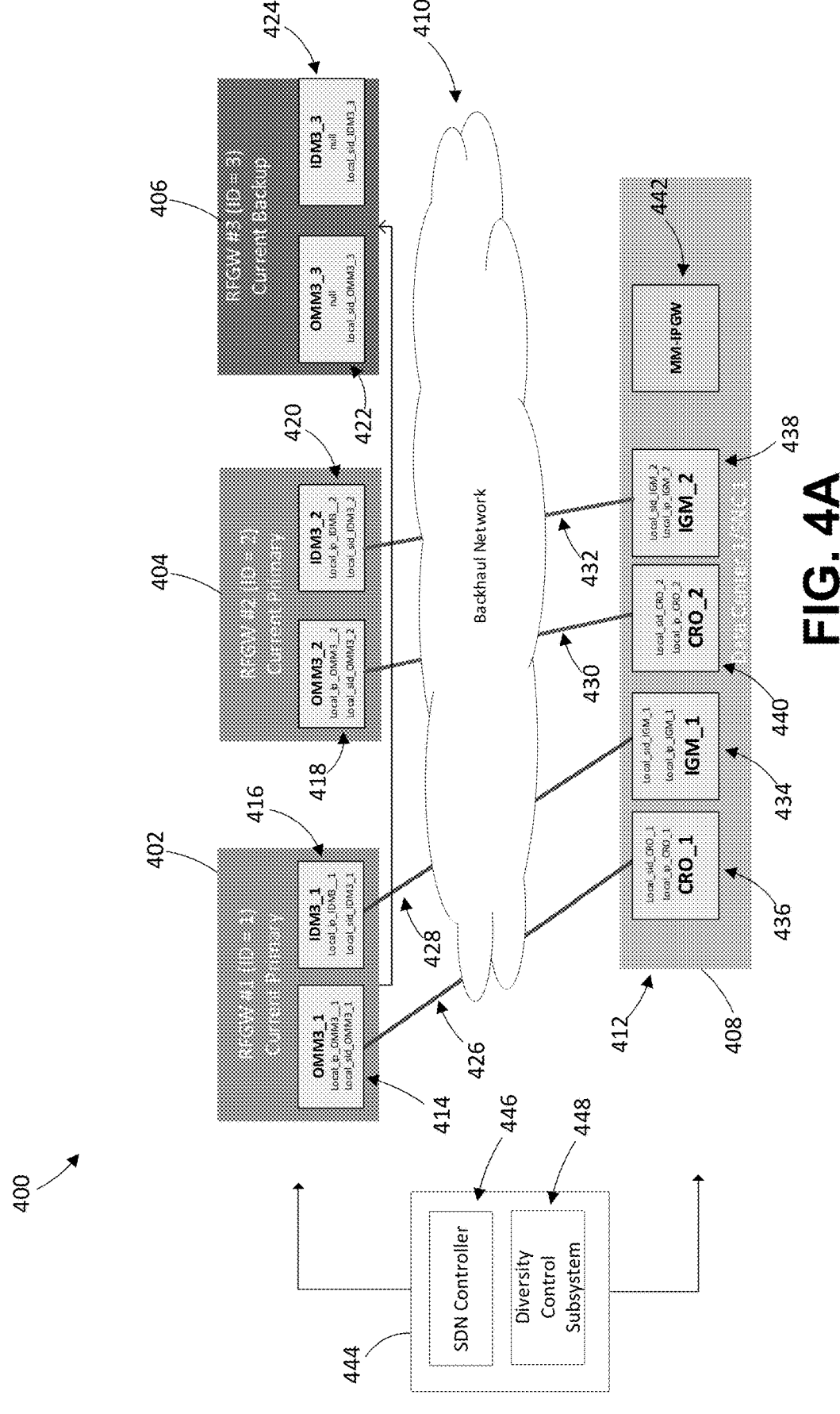
FIG. 4A is a schematic diagram showing the RF components and the SNC components of a gateway segment of a satellite communication system in an initial state.

FIG. 4A is a simplified illustration of an example network topology 400 that may be used to implement an RF gateway redundancy scheme of the present disclosure. The network topology 400 depicts RF gateways 402, 404, 406 and an SNC 408 of a gateway segment of a satellite communication system. RF gateways 402, 404, 406 and the SNC 408 communicate with each other via a backhaul network 410. Two of the RF gateways 402, 404 are initially designated primary RF gateways and one RF gateway 406 is initially designated as a backup RF gateway. Each of the RF gateways 402, 404, 406 includes an inroute communication component, i.e., inroute demodulator module (IDM), for communicating data received via an inroute channel of the RF gateways to the SNC 408 hosted at a data center 412. Each of the RF gateways 402, 404, 406 also includes an outroute communication component, i.e., outroute modulator module (OMM) for transmitting data from the SNC via an outroute channel of the RF gateway. In the embodiment of FIG. 4A, RF gateway 402 includes an OMM 414 and an IDM 416, RF gateway 404 includes an OMM 418 and an IDM 420, and RF gateway 406 includes an OMM 422 and an IDM 424.

The inroute and outroute communication components of each primary RF gateway 402, 404 are associated with corresponding inroute and outroute communication components at the SNC 408 to form outroute and inroute communication channels 426, 428 between primary RF gateway 402 and SNC 408 and outroute and inroute communication channels 430, 432 between primary RF gateway 404 and SNC 408. The inroute communication components for the SNC 408 include inroute group managers (IGMs), and the outroute communication components at the SNC 408 include Code Rate Organizers (CROs). IGMs perform inroute link layer functions, such as inroute bandwidth allocation and packet reassembly into IP packets. CROs are outroute link layer processing elements that are responsible for generating timing packet reference (SFNP) for remote terminal timing synchronization.

In the example of FIG. 4A, the SNC 408 includes an IGM 434 and a CRO 436 for the first primary RF gateway 402 and an IGM 438 and a CRO 440 for the second primary RF gateway 404. For the initial setup shown in FIG. 4A, the IGM 434 is associated with the IDM 416 of RF gateway 402 to form part of the inroute channel 428 for the first primary RF gateway 402, and the CRO 436 is associated with the OMM 414 of the RF gateway 402 to form part of the outroute channel 426 for the RF gateway 402. The IGM 438 is associated with the IDM 420 of RF gateway 404 to form part of the inroute channel 432 for the primary RF gateway 404, and the CRO 440 is associated with the OMM 418 of the RF gateway 404 to form part of the outroute channel 430 for the RF gateway 404. The SNC 408 may include at least one Internet Protocol Gateway (IPGW) 442 for handling traffic to and from an external network, or Internet, for the RF gateways 402, 404. The IPGW 442 may perform functions such as TCP acceleration, header compression, payload compression, inroute and outroute TCP spoofing, and the like, and may include specialized hardware components configured to automatically perform such functions.

A rolling RF gateway redundancy scheme is implemented and controlled by a redundancy control system 444. In embodiments, the redundancy control system 444 performs the initial configuration of the components of the RF gateways 402, 404, 406 and the SNC 408. In embodiments, predefined configuration information in the form of configuration files, transmission plans, and/or profiles is used to configure the gateway and SNC components. In embodiments, the initial RF gateway and/or SNC component assignments are treated as roles or positions which may be subsequently filled by any RF gateway or RF gateway component of the system.

The initial configuration information for the components may include frequency plan information which identifies inroute and outroute channels and/or inroute and outroute frequency bands to use for the primary RF gateways. Initial configuration information may also include peer information which maps inroute and outroute components of the primary RF gateways (i.e., OMMs and IDMs) to inroute and outroute transport components of SNCs (i.e., CROs and IGMs). In embodiments, the configuration information for the backup RF gateways does not define the frequency plan information (also referred to as an empty frequency plan) or peer information (also referred to as null mapping) for the backup RF gateway so that backup RF gateways remain disconnected from the satellite and SNC components of the system. To initialize an RF gateway or RF gateway component, the RF gateway or RF gateway component is instructed to access (e.g., download) configuration information and execute the frequency plan and/or peer component mapping defined therein. A similar process may be used to update the configuration of RF gateways and RF gateway components as components are switched-in and switched-out.

In embodiments, the redundancy control system 444 is implemented by at least one Satellite Defined Networking (SDN) controller 446. In embodiments, the redundancy control system includes two controllers: a Satellite Defined Networking Controller (SDN-C) and a Master Diversity Controller (MDC) (referred to herein collectively as SDN controller 446). The SDN-C takes care of routing between RF gateways and the SNC whereas the MDC initiates messaging to various components to indicate the RF gateway being switched to and the RF gateway being switched from. The MDC also keeps track of topology of dynamic primary and backup status. The SDN controller 446 is configured to receive and/or monitor various network parameters, such as current network topology, current resource mapping, backhaul network status, system priorities, initial resource mapping, desired resource mapping, RF gateway status, SNC status, network/link capacity, network/link performance (e.g., latency, jitter, packet loss), and the like, and is configured to initialize, update, and/or adjust routing and other network control information, component configurations, network topology, and the like to achieve and/or maintain predefined performance metrics, such as data transmission rates, quality of service, network availability, and the like. To this end, the SDN controller 446 is configured to generate and/or update configuration information, such as described above, for network components, including RF gateway and SNC components, and to cause the components to update their configurations based on the configuration information provided by the SDN controller 446.

The satellite communication system includes various application programming interfaces (APIs) which enable applications and other components to access and interact with the network. In embodiments, the APIs includes an RF Gateway Switchover API which defines the protocols, function calls, parameters, variables, and the like for switching-out and switching-in RF gateways. As used herein, the "switching-out" of an RF gateway refers to the process for causing an RF gateway to be disconnected from other network components and switched from an active or primary state or status to a backup, standby, or failed state or status. The "switching-in" of an RF gateway refers to the process for causing an RF gateway to be connected to other network components and switched from a backup or standby state or status to an active or primary state or status.

A switchover process may be triggered by any component of the satellite communication system including the RF components themselves. For example, in various implementations a switchover process may be triggered internally or externally using an exposed Application Programming Interface (API of the diversity controller subsystem. The SDN controller 446, RF gateway components 402, 404, 406, and other components of the system may be configured to monitor various performance metrics, such as fade level, link status, network status, etc. of RF gateways and components linked to the RF gateways to identify fault switchovers, such as when a performance metric falls below or exceeds a threshold value. In embodiments, fault switchovers may be detected using a diversity control subsystem 448 of the redundancy control system 444. The diversity control subsystem 448 may be configured to monitor the state or condition of the RF paths through the satellite communication system to detect outages, performance degradation, and the like. The diversity control subsystem 448 may also be configured to monitor and maintain the state or status information for RF gateway components. The diversity control subsystem 448 may be used to trigger a switchover process in response to RF path outages and component failures.

A switchover process may be triggered by configuring the components that detect a fault switchover, such as the diversity control subsystem 448, to make a call to the RF Gateway Switchover API that identifies the RF gateways to be switched out. In embodiments, the call may also identify the RF gateway to be switched in. When only a single backup RF gateway is utilized, the current backup RF gateway may be automatically included with the call. In embodiments in which multiple backup RF gateways are utilized, a suitable method, scheme, or selection criteria may be implemented to select a backup RF gateway to switch-in which may be automatically performed as part of the switchover process.

This disclosure also provides enhancements to satellite communication systems that enable fast and reliable switchover for redundancy schemes. To enable fast and reliable switchover, each RF inroute and outroute component, i.e., OMM and IDM, is configured and registered with the SDN controller 446 by providing the SDN controller 446 with a diverse device list for each RF gateway component. A diverse device list is included in the configuration information for RF gateway component. The diverse device list lists the other RF gateway components which may be used as backups for an RF gateway component. For example, for the OMM 414 of the RF gateway 402, the diverse device list includes the OMM 418 of the RF gateway 404 and the OMM 422 of the RF gateway 406. The diverse device list for the OMM 418 of the RF gateway includes the OMM 414 of the RF gateway 402 and the OMM 422 of the RF gateway 406. The diverse device list of the RF gateway 406 includes the OMMs 414, 418 of the RF gateways 402, 404. Similarly, the diverse device list for the IDM 416 of the RF gateway 402 includes the IDM 420 of the RF gateway 404 and the IDM 424 of the RF gateway 406, and so on.

As noted above, the configuration information for the OMMs and IDMs of the RF gateways may also include peer information which identifies the SNC component that the OMMs and IDMs are to be connected to. For the embodiment of FIG. 4A, the peer information for OMM 414 identifies the CRO 436 of the SNC 408, and the peer information for the IDM 416 identifies the IGM 434 of the SNC 408. The peer information for OMM 418 identifies the CRO 440 of the SNC 408, and the peer information for the IDM 420 identifies the IGM 438 of the SNC 408. The peer information is empty (i.e., null) for the components of backup RF gateways. The configuration process does not explicitly assign or maintain a status, such as "primary" or "backup," in the configuration information for the RF gateways or RF gateway components. RF gateways that get the empty plan assume the backup role for the system. In embodiments, the state or status of the RF gateways or RF gateway components is monitored and maintained by the diversity control subsystem 448, as described above.

Figure 4B:
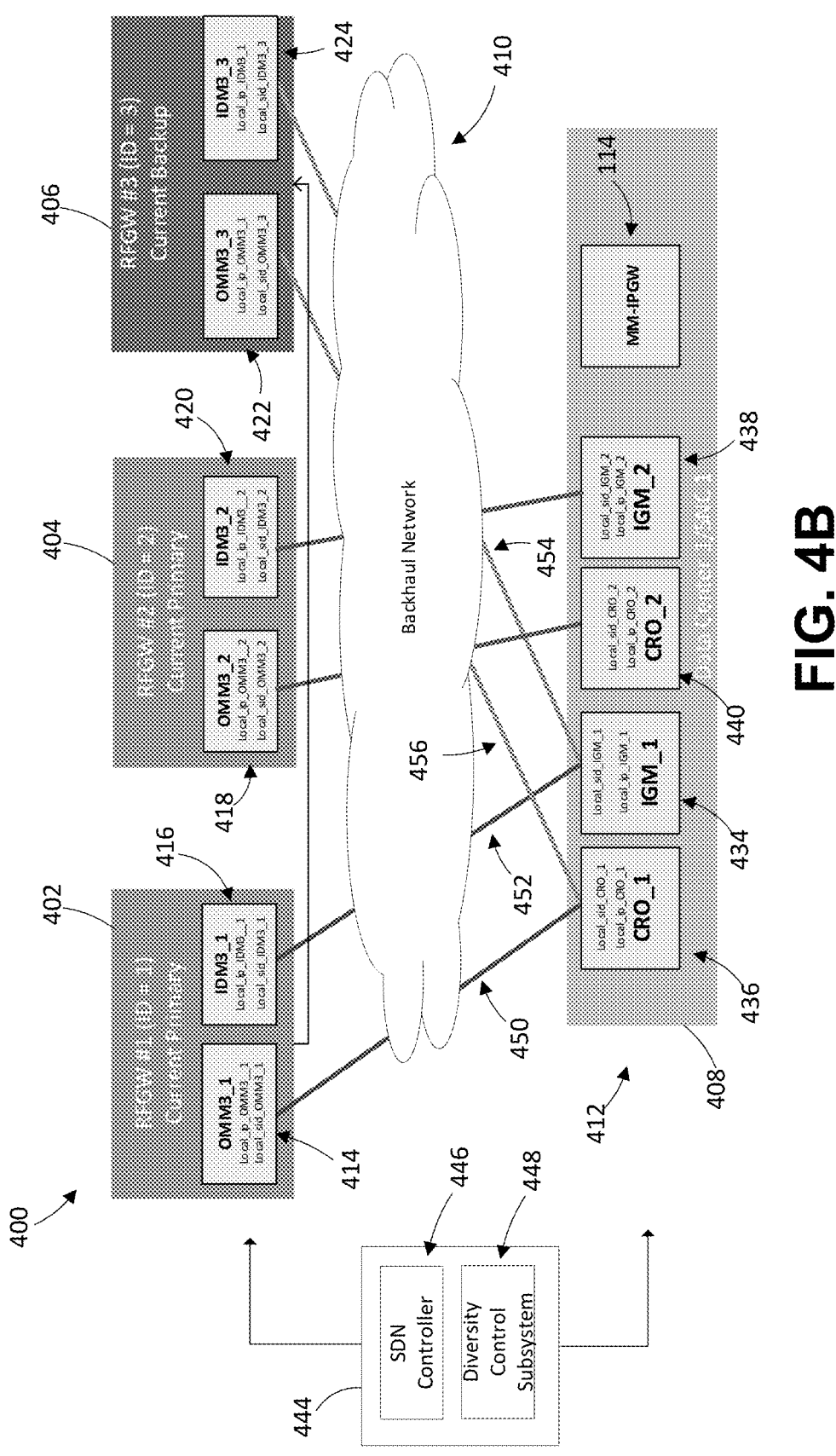
FIG. 4B shows the RF components and the SNC components of FIG. 4A during a transition phase of a switchover process.

FIG. 4B shows the network topology 400 of FIG. 4A during a transition phase of a switchover process that has been triggered in response to failure of the primary RF gateway 402. In embodiments, the switchover process may be triggered by making a call to the RF Gateway Switchover API identifying the failed RF gateway and the backup RF gateway. In embodiments, the RF components which are being switched-in, i.e., OMM 422 and IDM 424, and the RF components which are being switched-out, i.e., OMM 414 and IDM 416, may be informed of the switch, e.g., by using a communication scheme or protocol implemented in the satellite communication system. For example, the components may be informed of the switch using an active gateway multicast message to boostrappers.

The SDN controller 446 is also informed of the switchover event along with the identities of the RF gateway components to be switched-out and switched-in. The SDN controller 446 then implements the switchover process. In embodiments, the SDN controller 446 implements the switchover process by generating configuration updates and/or policy updates, such as Segment Routing V6 policy, for the RF gateway components to be switched-in and switched-out. In the embodiment of FIG. 4B, the configuration/policy updates are pushed to the OMM 414 and IDM 416 of RF gateway 402 and the OMM 422 and IDM 424 of RF gateway 406. The configuration/policy updates pushed to the switched-out components 414, 416 and the switched-in components 422, 424 correspond to a swap of frequency plans and peer information of the components. For example, the configuration information for the OMM 414 is updated with the frequency plan and peer information of OMM 422, and vice versa. As a result, the switched-in components 422, 424 execute the frequency plan and peer mapping of a primary RF gateway, and the switched-out components 414, 416 execute an empty frequency plan and null mapping of a backup RF gateway. The names and IDs of switched components otherwise remain the same.

Configuration/policy updates are also generated for peer SNC components, i.e., CRO 436 and IGM 434, associated with the RF components 414, 416 which are being switched-out. The peer SNC components may be identified from the configuration information for the RF components being switched-out. The configuration/policy updates for the peer SNC components are used to cause the peer SNC components to operate in a replicate mode during the transition phase in which their traffic is replicated and communicated to the RF components 414, 416 being switched-out and the RF components 422, 424 being switched-in. This is indicated in FIG. 4B by the lines 450, 456 connecting the CRO 436 to the OMM 414 of RF gateway 402 and the OMM 422 of RF gateway 406 and the lines 452, 454 connecting the IGM 434 to the IDM 416 of RF gateway 402 and the IDM 424 of RF gateway 406. This is done to maintain connectivity so that data transmission errors are minimized or avoided during the switchover process.

The SDN controller 446 may be configured to validate the switchover process before generating the configuration/policy updates. In embodiments, the SDN controller 446 is configured to verify that each component being switched-in is included in the diverse device list of the corresponding component that is being switched-out. For example, in the embodiment of FIG. 4B, the SDN controller 446 is configured to verify that OMM 422 is in the diverse device list of OMM 414 and to verify that the IDM 424 is in the diverse device list of IDM 416. If a switched-in component is not included in the diverse device list of the corresponding switched-out component, an error code may be generated, and the switchover process canceled.

Figure 4C:
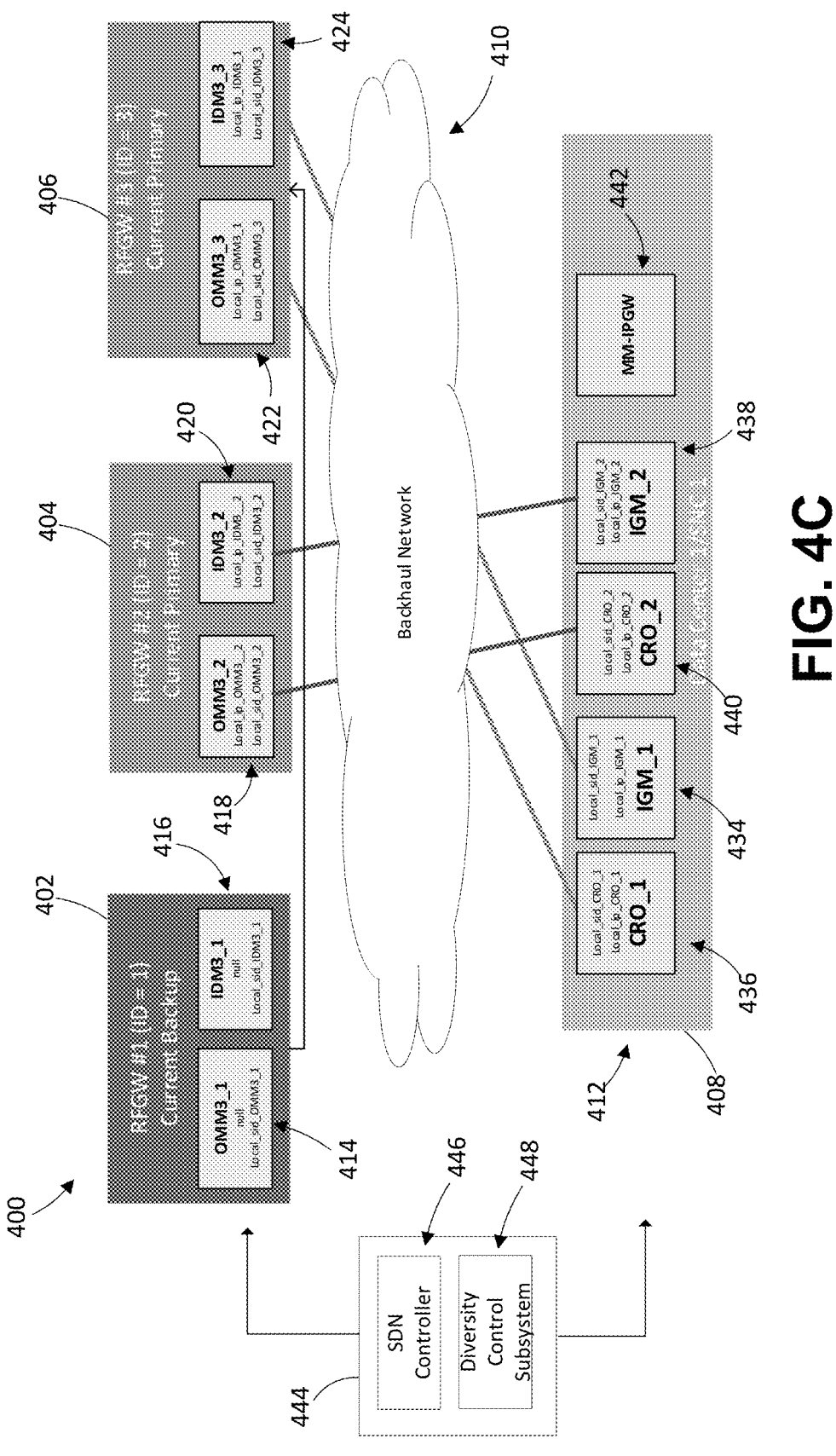
FIG. 4C shows the RF components and the SNC components of FIG. 4B after the switchover process has been completed.

Once the configuration/policy updates have been implemented in the switched-out and switched-in components and data is flowing through the switched-in components such that the performance of the inroute and outroute channels of the switched-in RF gateway components is within desired parameters, the SDN controller 446 may complete the switchover process by generating configuration/policy updates for the peer SNC components 436, 434 which place the components back in unicast mode so that replication of traffic to the switched-out components is stopped and traffic is routed only to the switched-in components 422, 424. FIG. 4C shows the network topology of FIGS. 4 and 5 after the switchover process has been completed. Once the status of the RF gateway components 422, 424 have been switched-in, the RF gateway 402 fills the role of a backup RF gateway and is idle until a fault switchover for one of the primary RF gateways is detected and redundancy is required. In embodiments, the diversity control subsystem 448 updates the status information of the RF gateways to indicate that switched-in RF gateways are primary RF gateways and switched-out RF gateways are backup RF gateways.

It is possible that a switched-out RF gateway, such as RF gateway 402, can become lost and not reachable in a corrective backup. Whenever the RF gateway is brought online, the SDN configuration and policy information will be automatically synced to the RF gateway. As soon as the configuration connection (i.e., Netconf) gets established between the RF components of the RF gateway and the SNC controller 446, the latest configuration/policy information including the current frequency plan is pushed to the RF components. The subsequent operation would then be different based on how the network is going to be operated. If one RFGW is intended for a designated backup, a switch back of the RF gateway to the RF gateway will take place after the switched-out RF gateway is restored or fade disappears. For this purpose, the Gateway Switchover API is called indicating a switch from RF gateway 406 to RF gateway 402. Please note that the switchover process is essentially the same for rolling backup and static backup scenarios. In various implementations, a satellite communication may be configured to implement both rolling and static backup schemes. User input may be used to designate whether such as satellite communication system utilizes a rolling backup scheme or a static backup scheme during use.

The switchback process is similar to the switchover process described above. The execution of the gateway switch back process triggers a switch back event which is informed to the SDN controller 446. The SDN controller 446 generates configuration/policy updates for the RF components 414, 416 of the RF gateway 402 being switched back in and the RF components 422, 424 of the RF gateway 406 being switched back out which essentially returns the RF gateways 402, 406 to the states shown in FIG. 4A. Configuration/policy updates are also generated for the peer SNC components 436, 434 which causes the peer SNC components to replicate traffic to both RF gateways 402, 406. Once the switch back process has been completed, the peer SNC components 434, 436 are updated again to unicast mode so that traffic is only routed to the RF gateway 402.

Figure 4D:
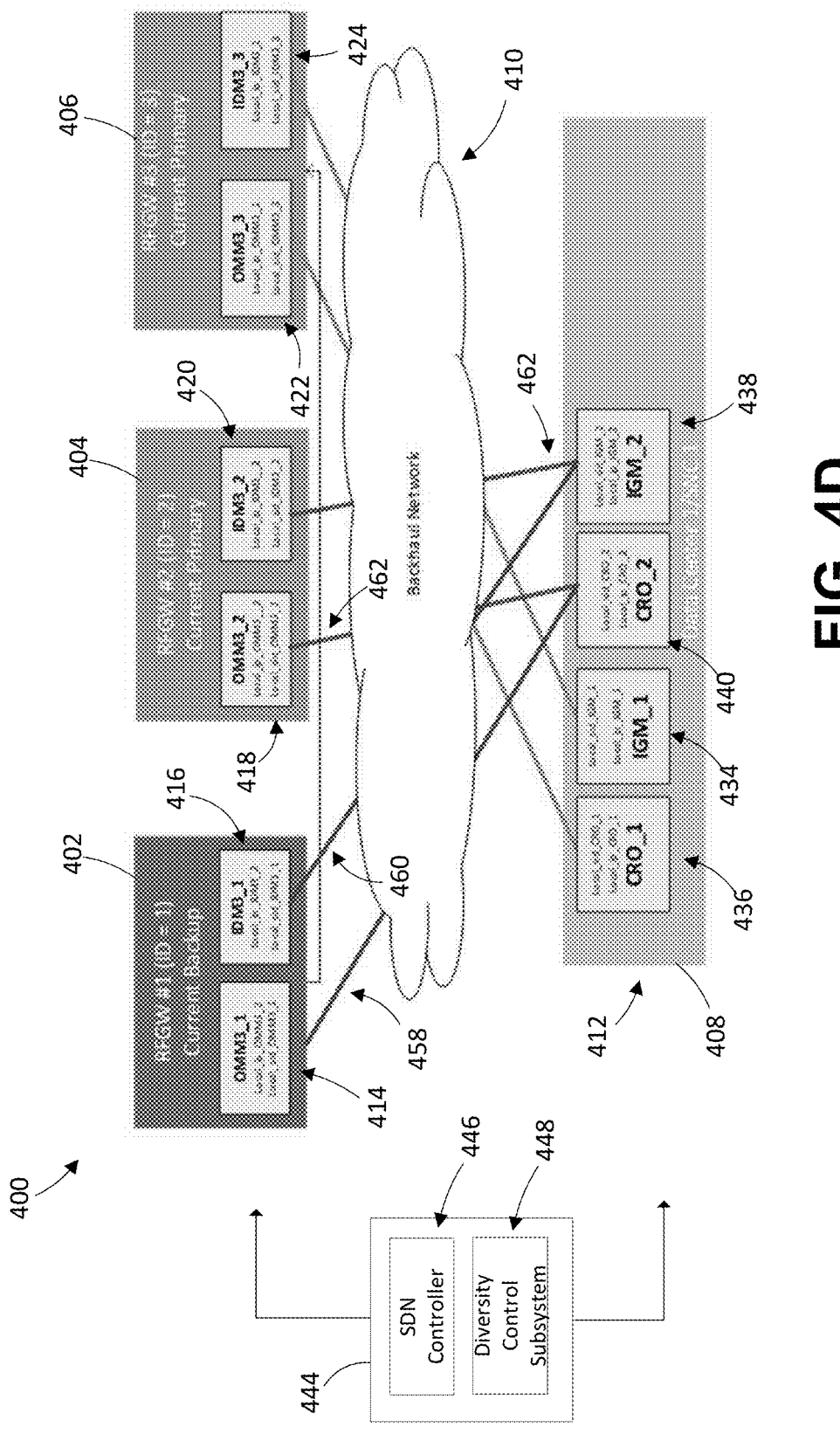
FIG. 4D shows the RF components and the SNC components of FIG. 4C during a transition phase of a second switchover process.

FIG. 4D shows the network topology during a transition phase of a switchover process from primary RF gateway 404 to backup RF gateway 402 (previously switched-out RF gateway). The process is essentially the same as the process for switching over from primary RF gateway 402 to backup RF gateway 406. The switchover process of FIG. 4D is triggered in response to failure of the primary RF gateway 404. In embodiments, the switchover process may be triggered by diversity control subsystem 448 which detects an outage, failure or unavailability of the RF gateway 404 and makes a call to the RF Gateway Switchover API identifying the failed RF gateway 404 and the backup RF gateway 402. In embodiments, the RF components which are being switched-in, i.e., OMM 414 and IDM 416, and the RF components which are being switched-out, i.e., OMM 418 and IDM 420, may be informed of the switch, e.g., by using a communication scheme or protocol implemented in the satellite communication system, such as an active gateway multicast message to boostrappers.

Figure 4E:
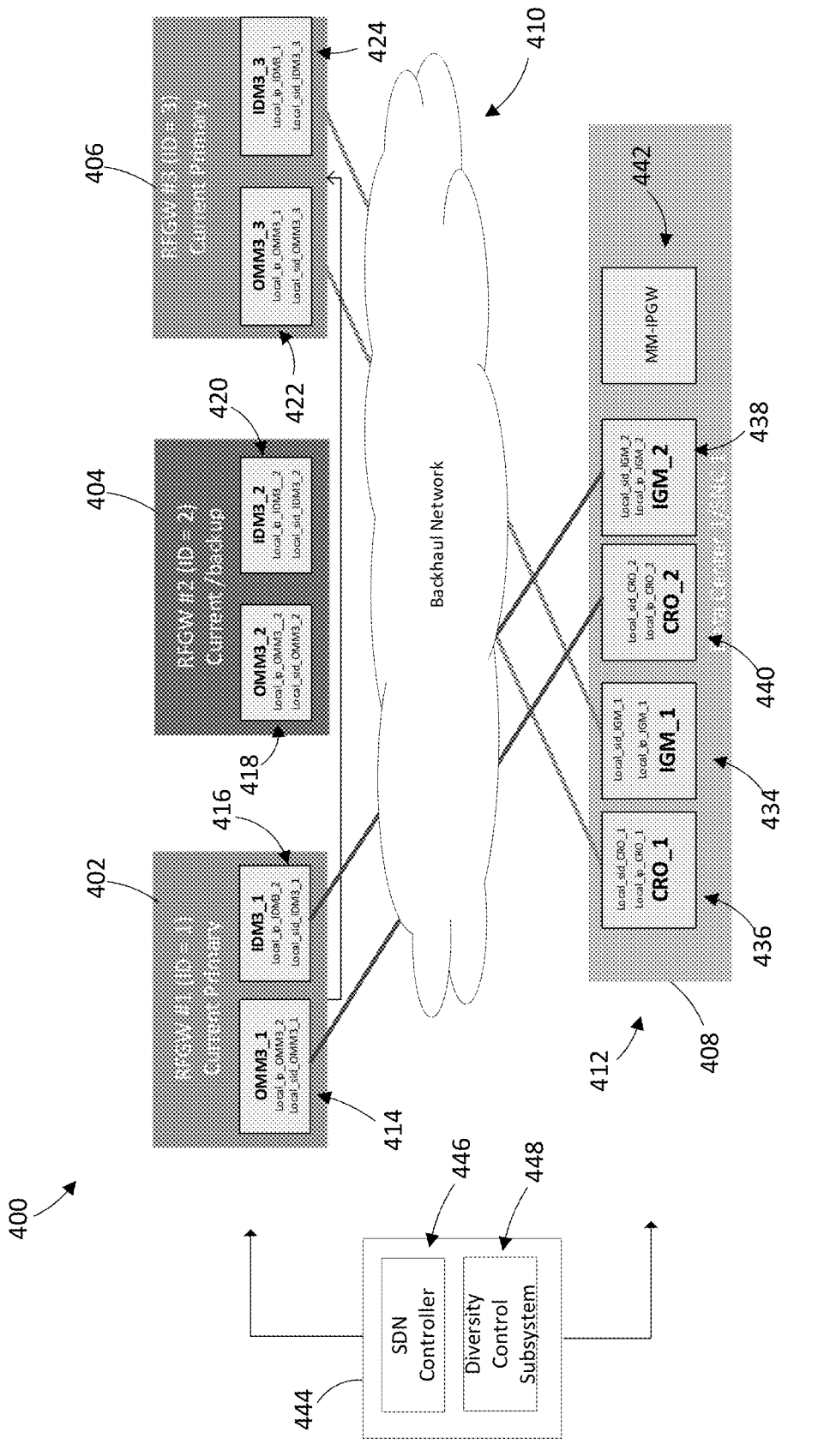
FIG. 4E shows the RF components and the SNC components of FIG. 4E after the second switchover process has completed.

The SDN controller 446 is also informed of the switchover event along with the identities of the RF gateways to be switched-out and switched-in. The SDN controller 446 may validate the switchover process before generating the configuration/policy updates. In embodiments, the SDN controller 446 is configured to verify that each component being switched-in is included in the diverse device list of the corresponding component that is being switched-out. The SDN controller 446 then implements the switchover process by generating configuration/policy updates for the components to be switched-in and switched-out. In the embodiment of FIG. 4E, the configuration/policy updates are pushed to the OMM 414 and IDM 416 of RF gateway 402 and the OMM 418 and IDM 420 of RF gateway 404. The configuration/policy updates pushed to the switched-out components 418, 420 and the switched-in components 414, 416 correspond to a swap of frequency plans and peer information of the components. As a result, the switched-in components 414, 416 execute the frequency plan and peer mapping of RF gateway 404, and the switched-out components 418, 420 execute an empty frequency plan and null mapping of a backup RF gateway.

Configuration/policy updates are also generated for the peer SNC components 440, 438 which cause the peer SNC components 440, 438 to operate in a replicate mode in which their traffic is replicated and communicated to the switched-in RF gateway 402 and the switched-out RF gateway 404 as indicated by the lines 458, 462 connecting the CRO 440 to the OMM 414 of RF gateway 402 and the OMM 418 of RF gateway 404 and the lines 460, 462 connecting the IGM 438 to the IDM 416 of RF gateway 402 and the IDM 420 of RF gateway 404. This is done to maintain connectivity so that data transmission errors are minimized or avoided during the switchover process.

Once the configuration/policy updates have been implemented in the switched-out and switched-in components and data is flowing through the switched-in components such that the performance of the inroute and outroute channels of the switched-in RF gateway components is within desired parameters, the SDN controller 446 may complete the switchover process by generating configuration/policy updates for the peer SNC components 440, 438 which cause the components to operate in unicast mode so that replication of traffic to the switched-out components 418, 420 is stopped. FIG. 4E shows the network topology after the switchover process of FIG. 4D has been completed.

The RF gateway redundancy schemes of this disclosure may also be implemented in a hybrid manner such that some RF gateways of a satellite communication system are configured for rolling redundancy while other RF gateways of the system are configured for static (i.e. non-rolling) redundancy. When both static and rolling redundancy are included in the same satellite communication system, various scenarios are possible including separate static and rolling redundancy groups and hybrid static and rolling redundancy groups in which RF gateways configured for static redundancy need to be backed up by RF gateways configured for rolling redundancy. This may be required to support regionalized gateways.

Figure 5:
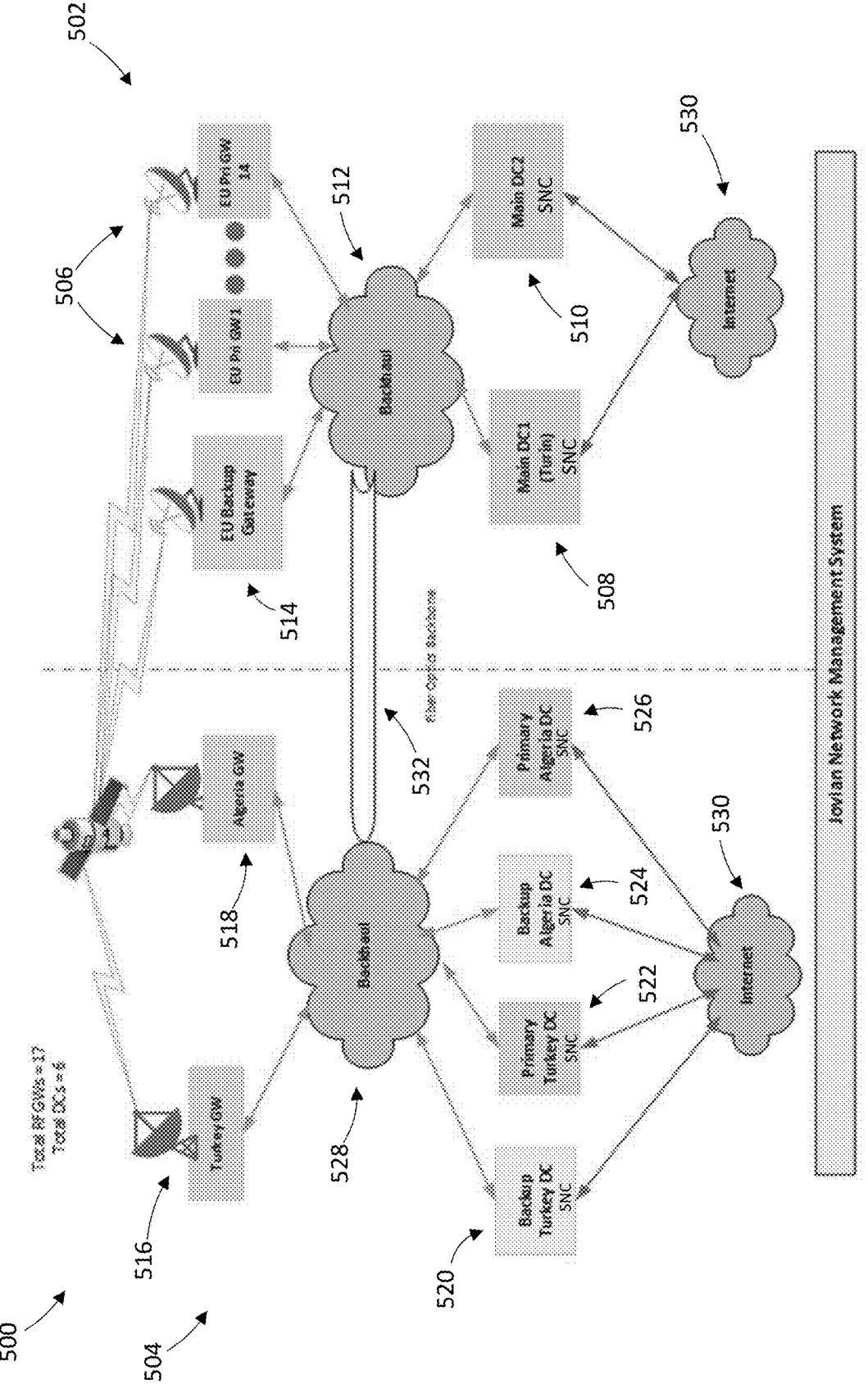
FIG. 5 is a schematic diagram of a satellite communication network having a main network and a regionalized network.

FIG. 5 shows an example network topology 500 for implementing a regionalized gateway with hybrid redundancy. In the example of FIG. 5, a main network 502 is shown on the right-hand side and a regionalized network 504 is shown on the left-hand side of the page. The main network 502 includes a plurality of main primary RF gateways 506 which are connected to two main SNCs 508, 510 in data centers (SNC/DC) via a backhaul network 512. The main network also includes a backup RF gateway 514 for backing up the main primary RF gateways 506. The designations of the RF gateways in the main network are initial designations. The main network 502 is configured to implement a rolling RF gateway redundancy scheme so that any of the RF gateways 506, 514 can be primary and backup RF gateways. In the example of FIG. 5, the main network 502 services a first geographic region, in this case Europe.

The regionalized network 504 includes a plurality of regional RF gateways. In the example of FIG. 5, regional RF gateways 516, 518 are located in Turkey and Algeria. Please note that the country names and geographic names used in the implementation of FIG. 5 are only examples and do not represent any specific implementation, requirement, or the like. Each regionalized RF gateway 516, 518 is connected to a dedicated set of SNCs and data centers. The RF gateway 516 for Turkey uses primary and backup SNCs/DCs 520, 522 for point of interface and Internet connectivity. The RF gateway for Algeria uses primary and backup SNCs/DCs 524, 526 for point of interface and Internet connectivity. For redundancy, the European backup RF gateway 514 can be switched-in for the European primary RF gateways 506. The European backup RF gateway 514 can also be switched in for the Turkey RF gateway 516 and the Algeria RF gateway 518. The European RF gateways 506 and SNCs/DCs 508, 510 communicate via a backhaul network 512, and the Turkey RF gateway 516, Algeria RF gateway 518, the Turkey primary and backup SNCs/DCs 520, 522, and Algeria primary and backup SNCs/DCs 524, 526 communicate via a backhaul network 528. The two backhaul networks 512, 528 are connected via a fiber optics backbone pipe 532. In normal operation, user traffic does not flow across the main and regionalized parts of the system. When the European backup RFGW 514 is switched-in for either the Turkey RF gateway 516 or the Algeria RF gateway 518, the router at the backhaul (located at Turin) directs traffic to the respective regional SNCs/DCs, and therefore traffic flows across two parts of the network.

The RF gateway backup in this system is not a static one because any one of the European RF gateways 506, 514 can be a backup RF gateway for the main network and for the regionalized networks at any given time. The Turkey RF gateway 516 and the Algeria RF gateway 518 can be backed up by the European backup RF gateway. In some implementations, if the feeder link resources of the current backup RF gateway are greater or equal to the combined resources of the Turkey and Algeria RF gateways 516, 518, then both the regionalized RF gateways 516, 518 (if lost simultaneously) can be backed up together by the same backup RF gateway of the main network. However, the switch procedure is executed one by one. For example, the Turkey RF gateway 516 may be switched over to the current backup RF gateway 514. After the completion of this switchover, the Algeria RF gateway 518 may then be switched over to the current backup RF gateway 514. Switching the Turkey RF gateway 516 and the Algeria RF gateway back in is also performed one by one. In other implementations, both regionalized gateways could be backed up at the same time. For example, switch procedures for switching both the Turkey RF gateway 516 and the Algeria RF gateway 518 over to the current backup RF gateway 514 may be performed together.

In the rolling RF gateway switch operation, the system supports any of the rolling backup RFGWs to be switched in for the regional RF gateways 516, 518 in the main part 502 of the network. However, when a regional RF gateway 516, 518 is restored operationally, the regional RF gateway 516, 518 should be switched back in right away. A regionalized RF gateway 516, 518 cannot be used as a rolling backup RF gateway. Consequently, the regionalized RF gateways 516, 518 operate as a primary RF gateway unless they are in a fault state.

In the example system of FIG. 5, the same network can have different parts (e.g., the main network and regionalized part) with a plurality of RF gateways and a plurality of SNCs in a many-to-many mapping participating in a rolling backup scenario. The regionalized part of the system has its own RF gateways and SNCs segregated from the components of the main part of the network, but failed RF gateways of the regionalized part can be backed up by the backup RF gateway of the main part of the system. The RF gateways of the regionalized part, however, cannot be used to back up the RF gateways of the main part of the system. The management system needs to configure and manage this type of topology. Since typically the regionalized RF gateways are smaller in size than the RF gateways of the main part, the current backup RF gateways may be used to back up more than one failed regionalized RF gateway if needed assuming that the backup RF gateway has sufficient hardware to take over two failed RF gateways. Because these regionalized RF gateways cannot be used as backup RF gateways in rolling group, once they are restored, a switch back procedure is performed to switch the restored regionalized RF gateway back in for the backup RF gateway. Therefore, for hybrid networks, such as shown in FIG. 5, two types of redundancy procedures may need to be supported.

FIG. 6 is a flow diagram depicting an example method 600 for backing up RF gateways of a satellite communication system, such as the satellite communication system of FIG. 1. The method 600 begins with designating a first RF gateway as an initial first primary RF gateway and a second RF gateway as an initial second primary RF gateway and configuring the initial first primary RF gateway and the initial second primary RF gateway to be in an active state to handle data transmissions (block 602). A third RF gateway of the satellite communication system is designated as an initial backup RF gateway which is configured to be in an idle state (block 604). A fault condition of the first initial primary RF gateway is detected (block 606). A first switchover process is then performed to switch the initial first primary RF gateway to a current backup RF gateway and to switch the initial backup RF gateway to a current first primary RF gateway (block 608). The current backup RF gateway is configured to be in the idle state, and the current first primary RF gateway is configured to be in the active state. A fault condition of the second initial primary RF gateway is then detected (block 610). A second switchover process is then performed to switch the current backup RF gateway to a current second primary RF gateway and to switch the initial second primary RF gateway to the current backup RF gateway (block 612). The current backup RF gateway is configured to be in the idle state, and the current second primary RF gateway is configured to be in the active state.

Figure 7:
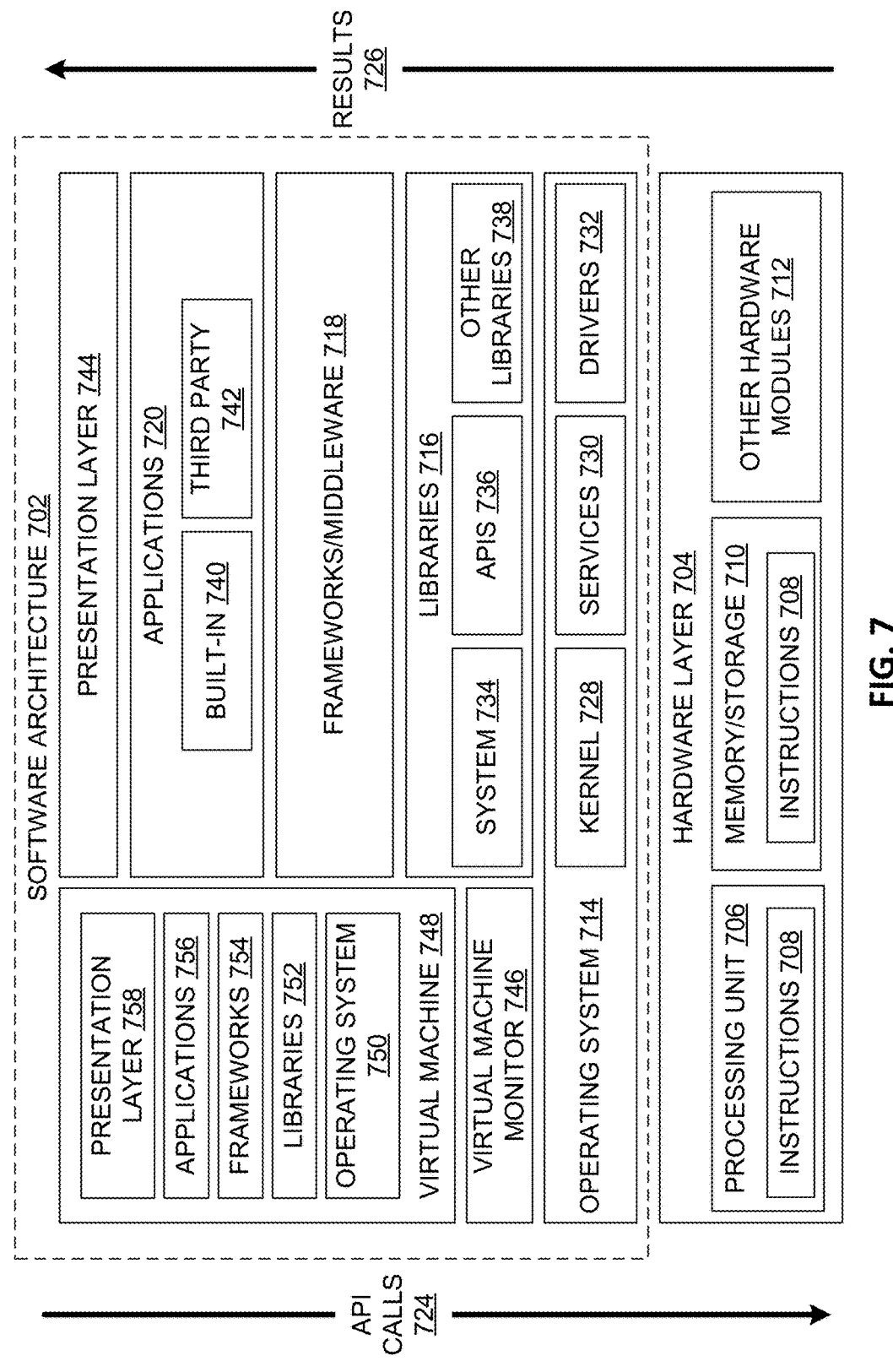
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, components of the satellite communication system 100 of FIG. 1. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
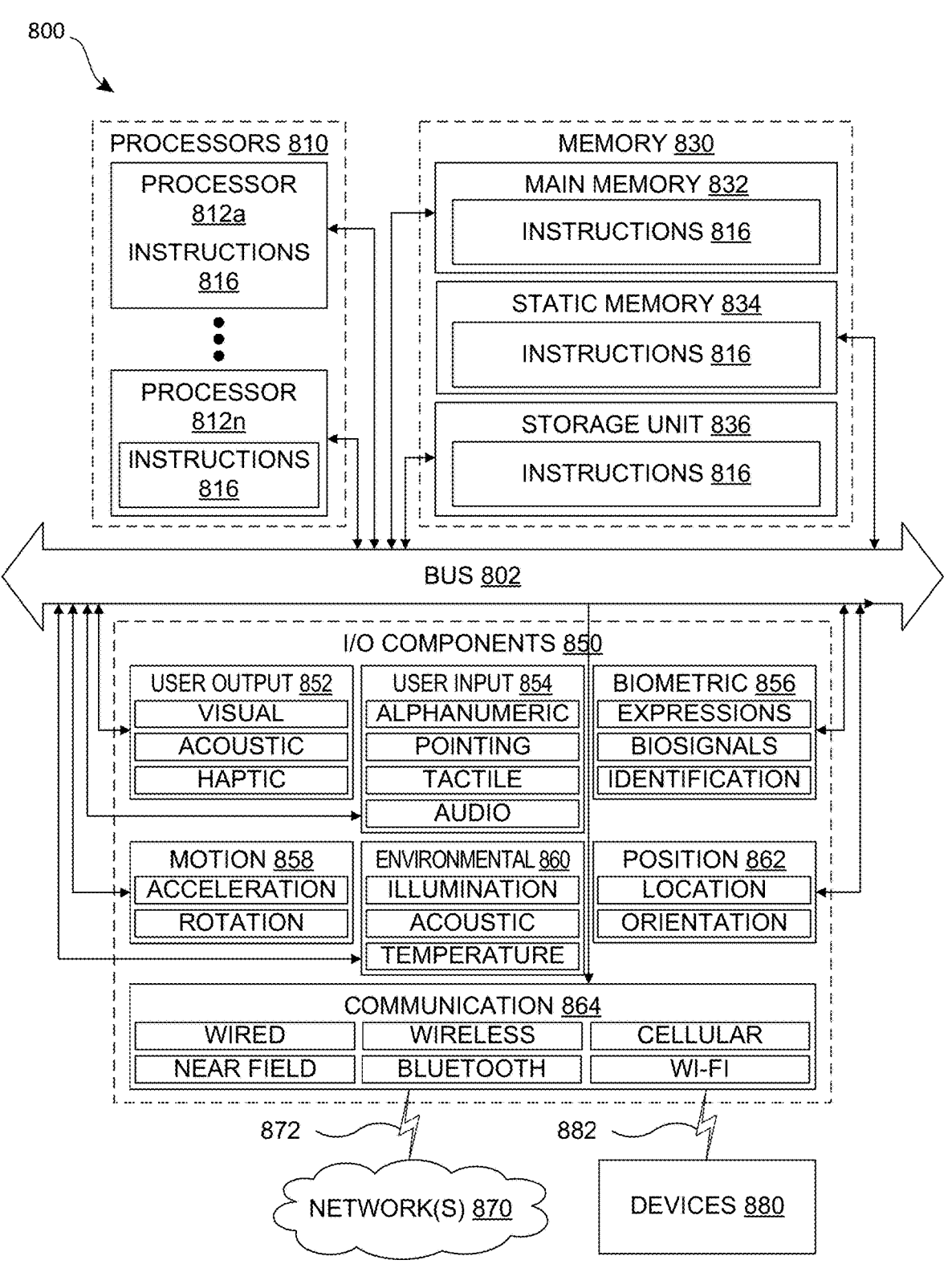
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:

a processor; and a memory in communication with the processor, the memory comprising executable instructions that, when executed by the processor alone or in combination with other processors, cause data processing system to perform functions of:

configuring a plurality of radio-frequency (RF) gateways as primary RF gateways for a satellite communication system and configuring the primary RF gateways to be in an active state to handle data transmissions;

configuring at least one RF gateway as backup RF gateways and configuring the backup RF gateways to be in an idle state;

detecting that a first primary RF gateway has a fault condition;

performing a first switchover process to switch a first backup RF gateway to be one of the primary RF gateways and to switch the first primary RF gateway to be one of the backup RF gateways;

detecting that a second primary RF gateway has the fault condition; and performing a second switchover process to switch a second backup RF gateway to be one of the primary RF gateways and to switch the second primary RF gateway to be one of the backup RF gateways.

Item 2. The data processing system of item 1, wherein configuring the first primary RF gateways including configuring the primary RF gateway to execute a first frequency plan and to have a first peer mapping to first satellite network core (SNC) components, and wherein configuring the backup RF gateways include configuring the backup RF gateways to execute an empty frequency plan and null mapping.

Item 3. The data processing system of any of items 1-2, wherein the first switchover process further comprises:

configuring the first backup RF gateway to execute the first frequency plan and to have the first peer mapping to the first SNC components; and configuring the first primary RF gateway to execute the empty frequency plan and to have the null mapping.

Item 4. The data processing system of any of items 1-3, wherein the second backup RF gateway corresponds to the first primary RF gateway.

Item 5. The data processing system of any of items 1-4, wherein the first switchover process further comprises:

configuring the first SNC components to route traffic to the first backup RF gateway and to the first primary RF gateway during a transition phase of the first switchover process; and configuring the first SNC components to route the traffic to only the first backup RF gateway once the first switchover process is completed.

Item 6. The data processing system of any of items 1-5, wherein the first switchover process and the second switchover process are controlled by a Satellite Defined Networking (SDN) controller.

Item 7. The data processing system of any of items 1-6, wherein a switchover time including payload switching time for switching the first back RF gateway to be one of the primary RF gateways and switching the first primary RF gateway to be one of the backup RF gateways is 200 ms or less.

Item 8. The data processing system of any of items 1-7, wherein the first switchover process further comprises:

configuring an SNC outroute component of the first SNC components to route traffic to an RF outroute component of the first backup RF gateway and to route traffic to an RF outroute component of the first primary RF gateway during the transition phase of the first switchover process;

configuring an SNC inroute component of the first SNC components to route traffic to an RF inroute component of the first backup RF gateway and to route traffic to an RF inroute component of the first primary RF gateway during the transition phase of the first switchover process; and configuring the SNC outroute component of the first SNC components to route traffic to only the RF outroute component of the current first primary RF gateway and the SNC inroute component to route traffic to only the RF inroute component of the first backup RF gateway once the first switchover process is completed.

Item 9. The data processing system of any of items 1-8, wherein the functions further comprise:

defining a diverse device lists for each of the primary RF gateways and the backup RF gateways that lists RF outroute components of the other primary RF gateways and the backup RF gateways as backup components for the RF outroute component and the RF inroute component of the other primary RF gateways and the backup RF gateways as backup components for the inroute RF component.

Item 10. The data processing system of any of items 1-9, wherein the functions further comprise:

verifying that the RF outroute component of the first backup RF gateway is in the diverse device list of the first primary RF gateway before performing the first switchover process;

when the RF outroute component of the first backup RF gateway is in the diverse device list, performing the first switchover process; and when the RF outroute component of the first backup RF gateway is not in the diverse device list, canceling the first switchover process and generating an error.

Item 11. A method of backing up radio-frequency (RF) gateways of a satellite communication system, the method comprising:

designating a plurality of RF gateways as initial primary RF gateways for the satellite communication system, the initial primary RF gateways being in an active state to handle data communications;

designating an additional RF gateway as an initial backup RF gateway for the satellite communication system, the initial primary RF gateways being in an idle state;

detecting that a first initial primary RF gateway has a fault condition;

performing a first switchover process to switch the first initial primary RF gateway to a current backup RF gateway and to switch the initial backup RF gateway to a first current primary RF gateway, the current backup RF gateway being in the idle state and the first current primary RF gateway being in the active state;

detecting that a second initial primary RF gateway has the fault condition; and performing a second switchover process to switch the current backup RF gateway to a second current primary RF gateway and to switch the second initial primary RF gateway to the current backup RF gateway, the current backup RF gateway being in the idle state and the second current primary RF gateway being in the active state.

Item 12. The method of item 11, further comprising:

configuring the initial primary RF gateways to execute respective first frequency plans and mapping the initial primary RF gateways to respective satellite network core (SNC) components; and configuring the initial backup RF gateway to execute an empty frequency plan and have a null mapping.

Item 13. The method of any of items 11-12, wherein the first switchover process further comprises:

configuring the first current primary RF gateway to execute a frequency plan of the first initial primary RF gateway and to have a same mapping to the SNC components as the first initial primary RF gateway; and configuring the current backup RF gateway to execute the empty frequency plan and to have the null mapping.

Item 14. The method of any of items 11-13, wherein the second switchover process further comprises:

configuring the second current primary RF gateway to execute a frequency plan of the second initial primary RF gateway and to have a same mapping to the SNC components as the second initial primary RF gateway; and configuring the current backup RF gateway to execute the empty frequency plan and to have the null mapping.

Item 15. The method of any of items 11-14, wherein the first switchover process further comprises:

configuring the SNC components associated with the first initial primary RF gateway to route traffic to the initial backup RF gateway and to the first initial primary RF gateway during a transition phase of the first switchover process; and configuring the SNC components associated with the first initial primary RF gateway to route the traffic to only the first current primary RF gateway once the first switchover process is completed.

Item 16. The method of any of items 11-15, further comprising:

mapping an RF outroute component of each of the initial primary RF gateways to a respective SNC outroute component;

mapping an RF inroute component of each of the initial primary RF gateways to a respective SNC inroute component.

Item 17. The method of any of items 11-16, wherein the first switchover process further comprises:

mapping an RF outroute component of the initial backup RF gateway to the SNC outroute component associated with the first initial primary RF gateway; and mapping an RF inroute component of the initial backup RF component to the SNC inroute component associated with the first initial primary RF gateway.

Item 18. A method for hybrid rolling radio-frequency (RF) gateway backup in a satellite communication system, the method comprising:

for a main network portion of the satellite communication system:

configuring a plurality of RF gateways as primary RF gateways for the main network portion of the satellite communication system and configuring the primary RF gateways to be in an active state to handle data transmissions;

configuring at least one RF gateway as backup RF gateways for the main network portion and configuring the backup RF gateways to be in an idle state;

detecting that a first primary RF gateway for the main network portion has a fault condition;

performing a switchover process to switch a first backup RF gateway to be one of the primary RF gateways of the main network portion and to switch the first primary RF gateway to be one of the backup RF gateways of the main network portion; and for a regionalized portion of the satellite communication system:

detecting that a first primary regional RF gateway for a first region of the regionalized portion has a fault condition;

performing a switchover process to switch a second backup RF gateway of the main network portion to be a primary RF gateway for the first region in place of the first primary regional RF gateway and placing the first regional primary RF gateway into an idle state;

once the first regional primary RF gateway does not have the fault condition, performing a switchover process to switch the first regional primary RF gateway in as the primary RF gateway for the first region.

Item 19. The method of item 18, further comprising:

while the first regionalized RF gateway has the fault condition:

detecting that a second primary regional RF gateway for a second region of the regionalized portion has the fault condition;

performing a switchover process to switch the second backup RF gateway to be a primary RF gateway for the second region in place of the second regionalized RF gateway portion and placing the second regional primary RF gateway into an idle state; and once the second regional primary RF gateway does not have the fault condition, performing a switchover process to switch the second regional primary RF gateway in as the primary RF gateway for the second region.

Item 20. The method of any of items 18-19, wherein the switchover process to switch the first regionalized RF gateway in as the primary RF gateway for the first region and the switchover process to switch the second regionalized RF gateway in as the primary RF gateway for the second region are performed one at a time, and wherein once the switchover process to switch the first regionalized RF gateway in as the primary RF gateway for the first region and the switchover process to switch the second regionalized RF gateway in as the primary RF gateway for the second region have been completed, the second backup RF gateway is switched in to be one of the backup RF gateways of the main network portion.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor alone or in combination with other processors, cause data processing system to perform functions of:
configuring a plurality of radio-frequency (RF) gateways as primary RF gateways for a satellite communication system and configuring the primary RF gateways to be in an active state to handle data transmissions;
configuring at least one RF gateway as backup RF gateways and configuring the backup RF gateways to be in an idle state;
detecting that a first primary RF gateway has a fault condition;
performing a first switchover process to switch a first backup RF gateway to be one of the primary RF gateways and to switch the first primary RF gateway to be one of the backup RF gateways;
detecting that a second primary RF gateway has the fault condition; and
performing a second switchover process to switch a second backup RF gateway to be one of the primary RF gateways and to switch the second primary RF gateway to be one of the backup RF gateways.

2. The data processing system of claim 1, wherein configuring the first primary RF gateways including
configuring the primary RF gateway to execute a first frequency plan and to have a first peer mapping to first satellite network core (SNC) components, and
wherein configuring the backup RF gateways include configuring the backup RF gateways to execute an empty frequency plan and null mapping.

3. The data processing system of claim 2, wherein the first switchover process further comprises:
configuring the first backup RF gateway to execute the first frequency plan and to have the first peer mapping to the first SNC components; and
configuring the first primary RF gateway to execute the empty frequency plan and to have the null mapping.

4. The data processing system of claim 3, wherein the second backup RF gateway corresponds to the first primary RF gateway.

5. The data processing system of claim 3, wherein the first switchover process further comprises:
configuring the first SNC components to route traffic to the first backup RF gateway and to the first primary RF gateway during a transition phase of the first switchover process; and
configuring the first SNC components to route the traffic to only the first backup RF gateway once the first switchover process is completed.

6. The data processing system of claim 5, wherein the first switchover process and the second switchover process are controlled by a Satellite Defined Networking (SDN) controller.

7. The data processing system of claim 6, wherein a switchover time including payload switching time for switching the first backup RF gateway to be one of the primary RF gateways and switching the first primary RF gateway to be one of the backup RF gateways is 200 milliseconds (ms) or less.

8. The data processing system of claim 7, wherein the first switchover process further comprises:
configuring an SNC outroute component of the first SNC components to route traffic to an RF outroute component of the first backup RF gateway and to route traffic to an RF outroute component of the first primary RF gateway during the transition phase of the first switchover process;
configuring an SNC inroute component of the first SNC components to route traffic to an RF inroute component of the first backup RF gateway and to route traffic to an RF inroute component of the first primary RF gateway during the transition phase of the first switchover process; and
configuring the SNC outroute component of the first SNC components to route traffic to only the RF outroute component of a current first primary RF gateway and the SNC inroute component to route traffic to only the RF inroute component of the first backup RF gateway once the first switchover process is completed.

9. The data processing system of claim 7, wherein the functions further comprise:
defining a diverse device list for each of the primary RF gateways and the backup RF gateways that lists RF outroute components of the other primary RF gateways and the backup RF gateways as backup components for the RF outroute component and an RF inroute component of the other primary RF gateways and the backup RF gateways as backup components for the inroute RF component.

10. The data processing system of claim 9, wherein the functions further comprise:

verifying that the RF outroute component of the first backup RF gateway is in the diverse device list of the first primary RF gateway before performing the first switchover process;

when the RF outroute component of the first backup RF gateway is in the diverse device list, performing the first switchover process; and when the RF outroute component of the first backup RF gateway is not in the diverse device list, canceling the first switchover process and generating an error.

11. A method of backing up radio-frequency (RF) gateways of a satellite communication system, the method comprising:

designating a plurality of RF gateways as initial primary RF gateways for the satellite communication system, the initial primary RF gateways being in an active state to handle data communications;

designating an additional RF gateway as an initial backup RF gateway for the satellite communication system, the initial primary RF gateways being in an idle state;

detecting that a first initial primary RF gateway has a fault condition;

performing a first switchover process to switch the first initial primary RF gateway to a current backup RF gateway and to switch the initial backup RF gateway to a first current primary RF gateway, the current backup RF gateway being in the idle state and the first current primary RF gateway being in the active state;

detecting that a second initial primary RF gateway has the fault condition; and performing a second switchover process to switch the current backup RF gateway to a second current primary RF gateway and to switch the second initial primary RF gateway to the current backup RF gateway, the current backup RF gateway being in the idle state and the second current primary RF gateway being in the active state.

12. The method of claim 11, further comprising:

configuring the initial primary RF gateways to execute respective first frequency plans and mapping the initial primary RF gateways to respective satellite network core (SNC) components; and configuring the initial backup RF gateway to execute an empty frequency plan and have a null mapping.

13. The method of claim 12, wherein the first switchover process further comprises:

configuring the first current primary RF gateway to execute a frequency plan of the first initial primary RF gateway and to have a same mapping to the SNC components as the first initial primary RF gateway; and configuring the current backup RF gateway to execute the empty frequency plan and to have the null mapping.

14. The method of claim 13, wherein the second switchover process further comprises:

configuring the second current primary RF gateway to execute a frequency plan of the second initial primary RF gateway and to have a same mapping to the SNC components as the second initial primary RF gateway; and configuring the current backup RF gateway to execute the empty frequency plan and to have the null mapping.

15. The method of claim 13, wherein the first switchover process further comprises:

configuring the SNC components associated with the first initial primary RF gateway to route traffic to the initial backup RF gateway and to the first initial primary RF gateway during a transition phase of the first switchover process; and configuring the SNC components associated with the first initial primary RF gateway to route the traffic to only the first current primary RF gateway once the first switchover process is completed.

16. The method of claim 15, further comprising:

mapping an RF outroute component of each of the initial primary RF gateways to a respective SNC outroute component;

mapping an RF inroute component of each of the initial primary RF gateways to a respective SNC inroute component.

17. The method of claim 16, wherein the first switchover process further comprises:

mapping an RF outroute component of the initial backup RF gateway to the SNC outroute component associated with the first initial primary RF gateway; and mapping an RF inroute component of the initial backup RF gateway to the SNC inroute component associated with the first initial primary RF gateway.

18. A method for hybrid rolling radio-frequency (RF) gateway backup in a satellite communication system, the method comprising:

for a main network portion of the satellite communication system:

configuring a plurality of RF gateways as primary RF gateways for the main network portion of the satellite communication system and configuring the primary RF gateways to be in an active state to handle data transmissions;

configuring at least one RF gateway as backup RF gateways for the main network portion and configuring the backup RF gateways to be in an idle state;

detecting that a first primary RF gateway for the main network portion has a fault condition;

performing a switchover process to switch a first backup RF gateway to be one of the primary RF gateways of the main network portion and to switch the first primary RF gateway to be one of the backup RF gateways of the main network portion; and for a regionalized portion of the satellite communication system:

detecting that a first primary regional RF gateway for a first region of the regionalized portion has a fault condition;

performing a switchover process to switch a second backup RF gateway of the main network portion to be a primary RF gateway for the first region in place of the first primary regional RF gateway and placing the first regional primary RF gateway into an idle state;

once the first regional primary RF gateway does not have the fault condition, performing a switchover process to switch the first regional primary RF gateway in as the primary RF gateway for the first region.

19. The method of claim 18, further comprising:

while the first regionalized RF gateway has the fault condition:

detecting that a second primary regional RF gateway for a second region of the regionalized portion has the fault condition;

performing a switchover process to switch the second backup RF gateway to be a primary RF gateway for the second region in place of the second regionalized RF gateway portion and placing the second regional primary RF gateway into an idle state; and once the second regional primary RF gateway does not have the fault condition, performing a switchover process to switch the second regional primary RF gateway in as the primary RF gateway for the second region.

20. The method of claim 19, wherein the switchover process to switch the first regionalized RF gateway in as the primary RF gateway for the first region and the switchover process to switch the second regionalized RF gateway in as the primary RF gateway for the second region are performed one at a time, and wherein once the switchover process to switch the first regionalized RF gateway in as the primary RF gateway for the first region and the switchover process to switch the second regionalized RF gateway in as the primary RF gateway for the second region have been completed, the second backup RF gateway is switched in to be one of the backup RF gateways of the main network portion.

* * * * *